United States Patent [19]

Stok

[11] 3,764,983

[45] Oct. 9, 1973

[54] CALIBRATION METHOD IN A DATA TRANSMISSION SYSTEM

[75] Inventor: Filipous Leon Stok, Emmasingel, Eindhoven, Netherlands

[73] Assignee: U.S. Philips Corporation, New York, N.Y.

[22] Filed: May 3, 1972

[21] Appl. No.: 249,908

[30] Foreign Application Priority Data

May 19, 1971 Netherlands ...................... 7106855

[52] U.S. Cl. ........... 340/150, 340/177 CA, 340/413

[51] Int. Cl. ............................................. G08b 5/22

[58] Field of Search .................... 340/150, 183, 184, 340/203, 206, 413, 177 CA

[56] References Cited

UNITED STATES PATENTS 3,665,399 5/1972 Zerh et al. ...................... 340/413 X 3,665,439 5/1972 Brummer et al. ................... 340/150

3,676,878 7/1972 Linder ........................... 340/413 X

*Primary Examiner*—Donald J. Yusko

*Attorney*—Frank R. Trifari

[57] ABSTRACT

A calibration method in a data transmission system in which only information variations are cyclically transmitted from measuring points in a data transmitter such as a control station, to one or more remote receivers such as television cameras having corresponding processing points. At one measuring point the adjustment of a variable direct voltage source having a minimum and maximum reference potential is modified to one of the potentials and subsequently to the other. The receiver includes a store and the transmitted information regarding variation is superimposed on the store information for the processing point up to and not farther than a fixed minimum or maximum value.

5 Claims, 1 Drawing Figure

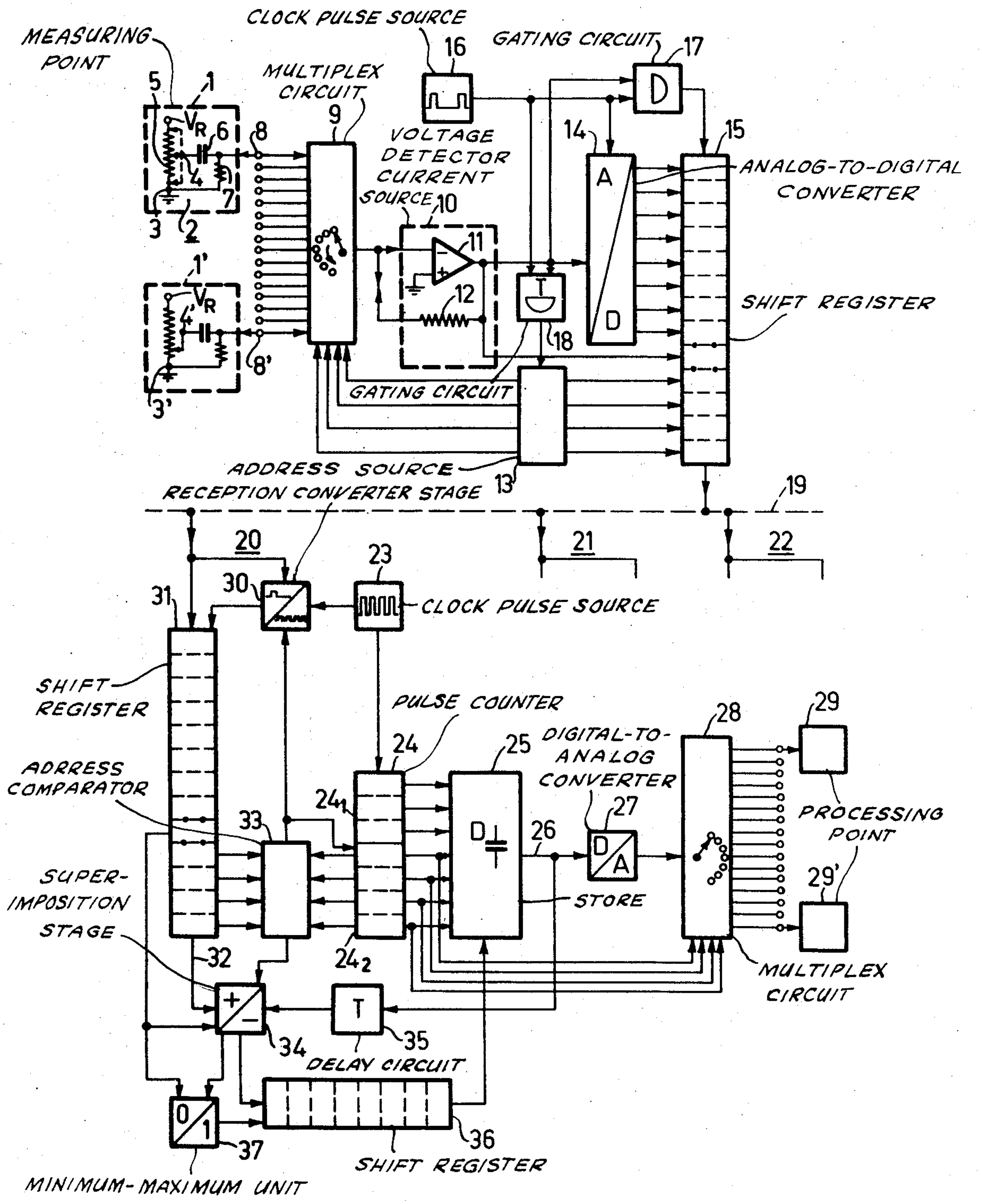
CLOCK PULSE SOURCE
GATING CIRCUIT
MEASURING POINT
MULTIPLEX CIRCUIT
VOLTAGE DETECTOR
CURRENT SOURCE
ANALOG-TO-DIGITAL CONVERTER
SHIFT REGISTER
GATING CIRCUIT
ADDRESS SOURCE
RECEPTION CONVERTER STAGE
CLOCK PULSE SOURCE
SHIFT REGISTER
PULSE COUNTER
DIGITAL-TO-ANALOG CONVERTER
ADRRESS COMPARATOR
PROCESSING POINT
SUPER-IMPOSITION STAGE
STORE
MULTIPLEX CIRCUIT
DELAY CIRCUIT
SHIFT REGISTER
MINIMUM-MAXIMUM UNIT

CALIBRATION METHOD IN A DATA TRANSMISSION SYSTEM

The invention relates to a calibration method in a data transmission system including a data transmitter and a receiver remote therefrom which are coupled through a transmission path, in which the data transmitter including a plurality of measuring points and the receiver including processing points corresponding thereto, said measuring and processing points being coupled together in a cycle through a time division multiplex circuit in which system only the magnitude of a variation at a measuring point which occurred during the previous cycle period is transmitted. Furthermore the invention relates to the data transmission system and a data transmitter and receiver suitable therefor.

Such a data transmission system is described in Netherlands Pat. No. 87,562, Feb. 16, 1958, to General Electric Company Ltd., London. This patent specification describes a system for remote measurement in which the information concerning variation in the measuring points is transmitted relative to the information present during the previous cycle. The transmission path is therefore only loaded for the transmission of information changes and is not needlessly loaded by the transmission of unchanged information. When it is desired that the instantaneous information present at the processing point is related to that at the measuring point, it is required to form the receiver with a store in which the instantaneous value is stored and is available for the processing point. The information in the store is adapted when a signal is received through the transmission path which indicates the magnitude and the direction of the variation at the measuring point.

Calibration is necessary for determining the relation between the instantaneous measuring point information and the processing point information. To this end it is possible to transmit the instantaneous value of the information of the measuring point through the transmission path to the receiver or to fix the information at the measuring point at a given instant at a known value and, when variations are no longer transmitted through the transmission path, the same value known at the receiver is introduced into the store by the operator himself.

The first-mentioned calibration method has the drawback that in the data transmission system the instantaneous values for the calibrations are also transmitted in addition to the information variations which make the system more complicated. In the second method the only assumption is that the calibration value is present at the measuring point while that at the processing point is introduced into the store. There is no question of real calibration in this case. The operator himself is required to intervene locally in the store and the processing point.

An object of the invention is to provide a method of calibration in a transmission system in which only signals corresponding to information variations are transmitted even when calibration is effected. To this end the calibration method is characterized in that at the measuring point which is formed with a variable direct voltage source including a terminal conveying a voltage to be varied between a minimum and a maximum reference potential the adjustment of the source is modified to one of the said potentials and subsequently to the other, the information regarding the variation being transmitted through the transmission path to the receiver, while in the receiver, which is formed with a store, the information regarding variation is superimposed on the store information present for the processing point up to and not farther than a fixed minimum or maximum value which corresponds to one of the said potentials at the measuring point.

One embodiment of a calibration method is furthermore characterized in that in a data transmission system including a data transmitter for a plurality of receivers coupled thereto, which are each formed with a store, the adjustment of the variable direct voltage source at the measuring point of the data transmitter is modified for effecting calibration after the data transmitter is decoupled from a receiver and is coupled to another receiver.

A data transmission system suitable for use of the calibration method is characterized in that the measuring point is formed with a direct voltage source variable between a maximum and a minimum reference potential, while in the receiver an output of a store is connected to a superimposition stage which is also coupled to the transmission path for the reception of the information regarding variation from the measuring points of the data transmitter, an output of the superimposition stage being connected to an information write input of the store, said receiver being provided with a unit an input of which is coupled to the superimposition stage and an output of which is coupled to the store, which unit, in case of an addition or subtraction in the superimposition stage exceeding the fixed maximum or minimum value applied the maximum or minimum value itself to the store.

The invention will be described in detail with reference to the accompanying FIGURE given as an embodiment of the transmission system.

In FIG. 1, 1 denotes a measuring point and 1' denotes a further measuring point which both form part of a system of sixteen measuring points which are further not shown. Measuring point 1 is formed with a variable direct voltage source 2 having a terminal 3 connected to ground as a reference potential and a terminal 4 which conveys the variable direct voltage. Terminal 4 is connected to the tap on a potentiometer 5 which is arranged between a terminal having a reference potential $V_R$ and terminal 3. Terminal 4 of the direct voltage source 2 is connected to ground through a capacitor 6 and a resistor 7. The junction of capacitor 6 active as a store and leakage resistor 7 of high value provides the output of the measuring point 1.

The 16 measuring points 1, 1' are connected to 16 inputs having contacts 8, 8' of a time division multiplex circuit 9. The time division multiplex circuit 9 has one output and is active as a selection switch which alternately couples each of the measuring points 1, 1' to the output in one cycle. The output of circuit 9 is connected to a voltage detector current source circuit 10. Circuit 10 is formed with a differential amplifier 11 having an inverting (−) and an non-inverting (+) input. The non-inverting input of amplifier 11 is connected to ground while the output is connected through a feedback resistor 12 to the inverting input connected to circuit 9.

Four control inputs of the time division multiplex circuit 9 are connected to an address source 13. The address source 13 determines by means of a code having $2^4 = 16$ possibilities the condition of the circuit 9, that is to say, which measuring point 1 or 1′ etc. is connected in the cycle to the circuit 10.

The operation of the measuring points 1, 1′, the time division multiplex circuit 9 and the voltage detector - current source circuit 10 is as follows: let it be assumed that for a previous cycle of the circuit 9 the position of potentiometer 5 at measuring point 1 is the same as at measuring point 1′ and that the ground potential occurs at contact 8. This means that capacitor 6 at measuring point 1 is charged to the voltage which is now present between the terminals 3′ and 4′. Subsequently the potentiometer 5 is set to the position as shown at measuring point 1. Before the circuit 9 interconnects the contact 8 to its output, contact 8 conveys a positive voltage which is equal to the potentiometer displacement. When circuit 9 interconnects contact 8 to the output the voltage detector-current source circuit 10 is activated. The differential amplifier 11 is of the type whose non-inverting input is connected to ground and provides a voltage of zero, i.e., the ground potential when the input voltage at the inverting input is zero and a positive output voltage is the result when the input voltage is negative and provides a negative output voltage when the input voltage is positive. It has been assumed that the input voltage for the differential amplifier 11 is positive so that the output conveys a negative voltage which is fed back through the resistor 12 to the input. The result is that the negative voltage at the output of amplifier 11 discharges the contact 8 conveying the positive voltage through the resistor 12 and the circuit 9. This means that negative charge is applied through the circuit 9 to contact 8 so that capacitor 6 is charged. When capacitor 6 is charged to the instantaneous direct voltage occurring at terminal 4, contact 8 conveys the ground potential. With the ground potential on contact 8 it likewise occurs at the input of the differential amplifier 11 so that the circuit 10 no longer detects any voltage and thus provides no current.

When at measuring point 1 a displacement to ground potential would have taken place instead of a potentiometer displacement to reference potential $V_R$, a negative voltage occurs on contact 8 which under the influence of the positive output voltage of differential amplifier 10 is reduced to ground potential through resistor 12.

The result is that a given displacement of potentiometer 5 effected between two cyclic switching conditions of circuit 9 causes circuit 10 to provide a positive or negative voltage, while the duration depends on the magnitude of the displacement and the direction of the displacement is given by the voltage polarity.

More refined embodiments of the voltage detector-current source circuit 10 are possible. For example, a buffer amplifier is provided so as to cause circuit 10 to pick up no input current at all. The resistor 12 may be replaced by a switched current source. A threshold action may be introduced.

For realizing a transmission in a digital manner, circuit 10 is connected to an analog-to-digital converter 14 (A/D) and to an input of a shift register 15. The positive or negative polarity of the output voltage of circuit 10 is stored in shift register 15 as a logical 0 or 1. In the analog-to-digital converter 14 the duration of the output voltage of circuit 10 being unequal to the ground potential is converted into a code which becomes available at eight outputs of converter 14. For obtaining the code converter 14 is connected to a clock pulse source 16. The converter 14 is, for example, provided in a manner not shown with a gate and a pulse counter in which the gate only passes the clock pulses to the pulse counter when the output voltage of circuit 10 is positive or negative. The eight outputs of converter 14 are then constituted by the outputs of the pulse counter which thus can count up to $2^8 = 256$ pulses. The outputs of converter 14 with the code are connected to inputs of shift register 15. Finally four inputs of shift register 15 are connected to the address source 13. The result is that in the shift register 15, which is of the parallel-in-series-out-type, the address information is stored in four stages, the information regarding the direction of the displacement of the potentiometer 5 at measuring point 1 is stored in one stage and the magnitude of the displacement is stored in eight stages.

For obtaining information for shift register 15 that the circuit no longer detects a voltage, circuit 10 is connected to a control input of shift register 15 via a gating circuit 17 to which also the clock pulse source 16 is connected. Gating circuit 17 enables shift register 15 for supplying a pulse train having 13 possible pulses in case of a first clock pulse after the circuit 10 again provides the ground potential for the gating circuit 1.

For obtaining information for the address source 13 that the next address of 16 possible addresses can be applied to the circuit 9 and shift register 15, circuit 10 and the clock pulse source are connected through a gating circuit 18 to a control input of the address source 13. The gating circuit 18 is provided with a time delay T which is required to ensure that during reading of the shift register 15 the address source 13 does not undergo any variation.

When the voltage detector-current source circuit 10 upon reception does not detect a voltage on an address given by the address source 13, the first occurring clock pulse from source 16 through gating circuit 18 results in the next address being provided by the address source 13. In that case shift register 15 is formed in such a manner that, when the analog-to-digital converter 14 has not been active, the shift register 15 likewise cannot become active so as to provide a pulse train.

The output of shift register 15 providing the pulse train is connected to a transmission path 19. Transmission path 19 couples the data transmitter (1–18) to a plurality of receivers 20, 21 and 22 to be further described. The transmission path 19 may be formed as a separate cable but it may alternatively be a normal telephone connection. When transmitting through a telephone connection, for example, the pulse train provided by the parallel series shift register 15 may be built up from pulses having a repetition frequency of 2,400 Hz while the clock pulse 16 operates, for example, at 24 KHz.

It is found that the transmission path 19 is only loaded when a measuring point variation in the data transmitter (1–18) has taken place so that due to the information transmission of the variations only, there is no unnecessary load on the transmission path 19.

Receiver 20 of the receivers 20, 21 and 22 coupled to the transmission path 19 is shown in greater detail and will be described hereinafter. Receiver 20 is provided with a clock pulse source 23 which is connected to a pulse counter 24 having seven stages and parallel outputs. The seven outputs of the pulse counter 24 are connected to a digital store 25 (D). The digital store 25 is a store having a content of $2^7 = 128$ bits. These 128 bits are subdivided into 16 groups of eight bits and for realizing the group formations the pulse counter 24 is built up from a counter $24_1$ having three stages and a counter $24_2$ having four stages. Counter $24_1$ counts to eight in one cycle and counter $24_2$ counts each eight-count. the four outputs of counter $24_2$ are connected through address inputs of store 25. For a given selected address the store information from store 25 appears at an output 26 under the control of the read counter 24. The output 26 then conveys a pulse train of $2^3 = 8$ pulses. This pulse train having eight pulses at the output 26 represents $2^8 = 256$ possibilities, which have been previously described with reference to the analog-to-digital converter 14 in the data transmitter (1–18). For obtaining analog information the output 26 is connected to a digital-to-analog converter (D/A) 27, an output of which is connected to a time division multiplex circuit 28. The four outputs of the counter for address information $24_2$ are connected to control inputs of the time division multiplex circuit 28 so that the address information determines the condition of circuit 28. The $2^4 = 16$ addresses correspond to 16 outputs of circuit 28 each having a processing point 29, 29′ etc. connected thereto.

It is found that in the receiver 20 the digital store 25 always implements the analog information for the processing points 29, 29′ in one cycle. Information possibly lost at a processing point 29, 29′ is thus implemented. The receiver 20 is active in a cycle with components 23 to 29 when there is no information provided through transmission path 19.

For receiving and processing information coming through transmission path 19 is it connected in the receiver 20 to a receiver and converter stage 30 and a shift register 31. When a pulse train occurs in the transmission path 19 intended for the receiver 20, which may be apparent because a separate reception address not further described is added to the described pulse train of shift register 15, the receiver stage 30 activates shift register 31. Shift register 31, which is essentially of the series-in-series-out-type having a series output 32, picks up the provided pulse train in thirteen stages. As described with reference to the shift register 15 there are four stages for the address information, one stage for the information regarding the direction of the potentiometer displacement at the measuring points 1, 1′ and eight stages for the magnitude of the displacement. The said four stages have parallel outputs to an address comparator 33 other inputs of which are connected to outputs of the counter for the address information $24_2$. In the address comparator 32 the address received by shift register 31 is compared with the addresses occurring in a cycle of 16 addresses in counter $24_2$. In case of coincidence of the received address and the address in the cycle, the address comparator 33 provides start and stop signals.

Counter $24_2$ receives a stop signal from the address comparator 33 while the read counter $24_1$ continues to count and causes the store 25 to provide the store information for the output 26. The reception and converter stage 30 receives a start signal so that the clock pulse 23 which is connected to the converter stage 30 acts on shift register 31 and reads this register to the series output 32. A superimposition stage 34 which receives a start signal from address comparator 33 is connected to the output 32. The superimposition stage 34 may be active as an adder (+) or a subtractor (−). The one or the other function is determined by connecting the stage of the shift register 31 with the information regarding the direction of the potentiometer displacement at, for example, the measuring point 1 to a control input of the superimposition stage 34. For performing the superimposition an input of the superimposition stage 34 is connected through a delay circuit 35 to the output 26 of the digital store 25.

In the superimposition stage 34 the pulse train coming from shift register 31 is superimposed on the pulse train built up from eight pulses and coming from the store 26 and being delayed over T = 5 pulse periods. The new superimposed code is applied from the superimposition stage 34 to a shift register 36 which is connected to an information write input of store 25. The new code is written in store 25 at the relevant address. Subsequently the start and stop signals provided by address comparator 33 terminate and the components 23 to 39 resume the cycle as described.

It is found that in the data transmission system only a variation occurring at the measuring points 1, 1′ is transmitted and not, as is common practice, the instantaneous values at the measuring points 1, 1′. Such a system may be used in case of remote measurement and remote control, for example, for the remote control of a television camera from a central station. The receivers 20, 21 and 22 are then television cameras and the data transmitter (1–18) is the station which provides the information for diagram control, focus control, amplification control etc. The cameras (20 – 22) may be ready for operation and may be correctly adjusted which adjustment is stored in the digital stores 25. Considered in absolute values the cameras (20 – 22) may be completely differently adjusted and may be adapted to the scenes to be picked up. When changing over from one to the other camera, for example, from 21 to 20, the station (11–18) may start to act on the camera 20 but this is effected only when at the measuring points or adjusting points 1, 1′ a variation has been introduced so as to modify the camera adjustment. Since only variations occurring at the measuring points 1, 1′ and not the instantaneous values are transmitted, the result is that the changeover between the cameras 20, 21 and 22 can be effected in a simple manner.

In case of correct adjustment of the cameras 20, 21 and 22 modification at the measuring points 1, 1′ need not be performed in the station (1 – 18) when there is a change-over between the cameras.

When it is desirable to know at the station (1 – 18) which instantaneous value is present at, for example, the processing point 29 for camera 20 or when it is desired to introduce at the processing point 29 an equal instantaneous value as occurs at the measuring point 1 in the station (1 – 18) a calibration must be performed. Likewise calibration may be required for control region adaptation. In fact, when at the measuring point 1 terminal 4 conveys a voltage which is almost equal to $V_R$ while at the processing point 29 and store 25 a value occurs about ground potential, the control for both points 1 and 29 will go out of adjustment. A further increase in the voltage on terminal 4 to potential $V_R$ is hardly possible while for a reduction the processing point 29 is almost immediately brought to ground potential. Calibration may be used in this case so as to cause the control regions to coincide.

To be able to perform a calibration in the data transmission system in which even now only variations from the measuring points 1, 1' and no instantaneous values are transmitted, the receiver 20 is furthermore provided with a unit 37. An input of unit 37 is connected to the stage in the shift register 31 in which the information regarding the direction of the potentiometer displacement of the measuring points 1, 1' is stored. Another input of the unit 37 is connected to an output of the superimposition stage 34 and the output is connected to a set input of register 36.

In the superimposition stage 34 the digital signal at output 32 is added to or subtracted from the digital signal at output 26. The digital signals occur as pulse trains built up of eight pulses which are combined in a binary manner in eight additions or subtractions. In case of addition there is a known rule of "carry 1" and in case of subtraction it is "borrow 1." When an addition is effected in superimposition stage 34 the result is that for the eighth addition also "carry 1" is effected and this is an indication that the maximum binary number of eight ones has been exceeded. Since the ninth 1 cannot be stored in the shift register 36 and store 25 the remaining number of eight bits is in no usable relation at all to the prior number of the store 25 and the modification number of register 31 to be added thereto. Erroneous information would be stored in store 25.

The same is effected for an eighth subtraction in which another 1 of a ninth bit which is absent is to be borrowed; the minimum binary number of eight zeros is passed and erroneous information for store 25 is the result.

In the unit 37 it is detected that for the eighth addition or subtraction there is still a 1 to be carried or to be borrowed. The superimposition stage 34 makes this 1 available for the unit 37 which, dependent on the adding or subtracting information from the fifth stage of register 31, subsequently introduces eight ones or zeros into register 36. The information in store 25 is brought to and maintained at this maximum or minimum value.

A calibration method can be performed in a simple manner with the aid of unit 37. The tap on potentiometer 5 at measuring point 1 is connected to the terminal conveying the stabilized reference potential $V_R$ and is subsequently applied to terminal 3 conveying the ground potential, or conversely. When the instantaneous, absolute value at processing point 29 is lower than at measuring point 1, the maximum value in receiver 20 is not achieved, but the maximum value (ground potential). During the period when after achieving the minimum value in receiver 20 the tap on potentiometer 10 is still further displaced, the unit 37 introduces zeros into the store 25. After information about variation is no longer transmitted the tap on potentiometer 5 at measuring point 1 may be arbitrarily adjusted and the same absolute value occurs at processing point 29.

When the instantaneous absolute value at processing point 29 is higher than at measuring point 1, the maximum value (reference potential $V_R$) reaches the receiver 20 and unit 37 introduces the eight ones into the store 25 during the further potentiometer displacement at measuring point 1.

Shift register 36 is provided for a simple embodiment of store 25, but the unit 37 may alternatively act directly on the then more intricate store 25 for 0 or 1 introduction.

It is possible to provide a button at measuring point 1 so that when the button is depressed an automatic displacement of the tap on potentiometer 5 to both reference potentials is effected once.

Instead of the series application of information from shift register 31 to superimposition stage 34, register 31 might alternatively provide this information through parallel outputs.

What is claimed is:

1. A calibration method in a data transmission system including a data transmitter and a receiver remote therefrom which are coupled together through a transmission path, the data transmitter including a plurality of measuring points and the receiver including corresponding processing points which must be calibrated, said measuring and processing points being coupled together in a cycle through a time division multiplex circuit in which system only the magnitude of a variation at a measuring point which occurred during the previous cycle period is transmitted,characterized in that at the measuring point (1) which is formed with a variable direct voltage source (2) including a terminal (4) conveying a voltage to be varied between a minimum (0) and a maximum reference potential ($V_R$) the adjustment of the source (2) is modified to one of the said potentials and subsequently to the other, the information regarding the variation being transmitted through the transmission path (19) to the receiver (20,21,22), while in the receiver, which is formed with a store (25), the information regarding variation is superimposed on the store information present for the processing point (29) up to and not farther than a fixed minimum or maximum value which corresponds to one of the said potentials (0, $V_R$) at the measuring point (1).

2. A calibration method as claimed in claim 1, characterized in that in a data transmission system including a data transmitter (1–18) for a plurality of receivers (20,21,22...) coupled thereto, which are each formed with a store (25), the adjustment of the variable direct voltage source (2) at the measuring point (1) of the data transmitter is modified for effecting calibration after the data transmitter is decoupled from a receiver (e.g. 22) and is coupled to another receiver (e.g., 20).

3. A data transmission system, comprising a data transmitter; a data receiver remote from the transmitter; and a transmission path coupling the transmitter to the receiver, the data transmitter comprising a plurality of measuring points each individually capable of providing measuring signals corresponding to differential increases and decreases in the magnitude of the corresponding measuring point, the maximum magnitudes of all the measuring points being substantially equal, the minimum magnitudes of all the measuring points being substantially equal, sampling means for cyclically converting the measuring signals into a time division multiplex signal, means for transmitting the time division multiplex signal through the transmission path to the data receiver; the data receiver comprising a processing point correspoinding to each measuring point, the processing points each capable of being set to a maximum and a minimum magnitude in response to processing signals, means for converting the received time division multiplex signal into a series of received measuring signals, a memory connected to the processing points for storing processing signals corresponding to each processing point, means for superimposing the received measuring signals on the corresponding stored processing signals, the result of the superimposition being stored in the storage means as an updated processing signal, detector means connected to the superimposing means for sensing an undated processing signal exceeding a value corresponding to the maximum magnitude of the measuring points and for substituting into the memory in response thereto an updated processing signal corresponding to the maximum magnitude of the measuring points, the detection means further sensing an updated processing signal having a value less than the value corresponding to the minimum magnitude of the measuring points and for substituting in response thereto into the memory an updated processing signal corresponding to the minimum magnitude of the processing points, whereby manual adjustment of a measuring point to the maximum and then to the minimum values synchronizes the measuring points to the processing points.

4. A data transmission system as claimed in claim 3, wherein the store comprises a digital store, the receiver further comprising a pulse counter for reading the store, a clock pulse source connected to the pulse counter, a counter for address information and a read counter, the transmission path being information and a read counter, the transmission path being connected through a shift register to the superimposition stage, address information outputs of said shift register being connected to an address comparator to which the said counter for address information is connected, said address comparator applying stop and start signals to the counter for addressing information and to the superimposition stage.

5. A data transmission system as claimed in claim 3, further comprising a shift register connecting the superimposition stage to the information input of the store, while the said unit for introducing the maximum or the minimum value has an output connected to a set input of the shift register.

* * * * *

PO-1050 (5/69)

UNITED STATES PATENT OFFICE
CERTIFICATE OF CORRECTION

Patent No. 3,764,983 Dated October 9, 1973

Inventor(s) FILIPPUS LEON STOK

It is certified that error appears in the above-identified patent and that said Letters Patent are hereby corrected as shown below:

ON THE TITLE PAGE

Paragraph No. [75] Inventor

"Filipous" should be --Filippus--;

IN THE SPECIFICATION

Col. 7, line 51, "maximum" should be --minimum--;

IN THE CLAIMS

Claim 4, line 6, cancel "the transmission path being information and a--;

line 7, cancel "read counter,".

Signed and sealed this 19th day of March 1974.

(SEAL)
Attest:

EDWARD M.FLETCHER,JR.
Attesting Officer

C. MARSHALL DANN
Commissioner of Patents

220